(12) United States Patent
Lazo Martinez et al.

(10) Patent No.: US 10,690,957 B2
(45) Date of Patent: Jun. 23, 2020

(54) DISPLAY APPARATUS AND METHOD FOR MANUFACTURING THE SAME

(71) Applicant: Samsung Display Co., Ltd., Yongin-Si, Gyeonggi-Do (KR)

(72) Inventors: Israel Esteban Lazo Martinez, Hwaseong-si (KR); Heungshik Park, Seoul (KR); Kichul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/977,902

(22) Filed: May 11, 2018

(65) Prior Publication Data

US 2019/0049786 A1    Feb. 14, 2019

(30) Foreign Application Priority Data

Aug. 8, 2017  (KR) ........................ 10-2017-0100552

(51) Int. Cl.
*G02F 1/1335*    (2006.01)
*G02B 5/30*    (2006.01)

(52) U.S. Cl.
CPC ..... *G02F 1/133528* (2013.01); *G02B 5/3058* (2013.01); *G02F 2001/133548* (2013.01); *G02F 2001/133565* (2013.01)

(58) Field of Classification Search
CPC ...... G02F 1/1333; G02F 1/136; G02F 1/1362; G02F 1/1368; G02F 1/136286; G02F 1/1335; G02F 1/133514; G02F 1/133528; G02F 1/133512; G02F 1/133345; G02F 1/134309; G02F 1/1339; G02F 1/136227; G02F 1/1343; G02F 1/136209; G02F 1/1345; G02F 1/1336; G02F 1/133615;
(Continued)

(56) References Cited

U.S. PATENT DOCUMENTS 6,307,613 B1 * 10/2001 Iida ................... G02F 1/133528
349/110
6,400,438 B1 * 6/2002 Noritake ........... G02F 1/133351
349/149

(Continued)

FOREIGN PATENT DOCUMENTS

KR    10-0865843 B1    10/2008
KR    10-2011-0007735 A    1/2011

OTHER PUBLICATIONS

Kim, Hoon, et al.; "New three-gamma-curves-integrated VA LCD design for excellent image quality and enhanced transmittance"; Journal of Information Display, 2016, vol. 17, No. 3; pp. 109-115.
(Continued)

*Primary Examiner* — Thoi V Duong
(74) *Attorney, Agent, or Firm* — Innovation Counsel LLP

(57) ABSTRACT

Provided is a display apparatus. The display apparatus includes a display module on which a display area and a non-display area configured to surround the display area and a backlight unit providing light to the display module. The display module includes an upper substrate including a wire layer configured to polarize the incident light, a lower substrate including a plurality of pixel electrodes and a common electrode line, and a liquid crystal layer disposed between the upper substrate and the lower substrate.

19 Claims, 14 Drawing Sheets

(58) Field of Classification Search
CPC .......... G02F 1/134336; G02F 1/13458; G02F 2001/133548; G02F 2001/133565; G02F 2001/13685; G02F 2001/1635; G02F 2201/52; G02F 1/1337; G02F 2201/121; G09G 2300/0426; G02B 5/3058
See application file for complete search history.

(56) References Cited

U.S. PATENT DOCUMENTS

| | | | |
|---|---|---|---|
| 8,199,282 B2 | 6/2012 | Sugita et al. | |
| 2012/0057106 A1* | 3/2012 | Park | G02F 1/133528 349/96 |
| 2013/0250412 A1* | 9/2013 | Aota | G02B 5/3058 359/485.05 |
| 2015/0277200 A1* | 10/2015 | Baek | G02F 1/133512 349/43 |
| 2016/0041430 A1* | 2/2016 | Lee | G02F 1/133617 349/96 |
| 2019/0033655 A1* | 1/2019 | Abileah | G02F 1/133516 |

OTHER PUBLICATIONS

Schiltz, André; An Empirical Model for Planarization with Polymer Solutions; Japanese Journal of Applied Physics, 1995, Aug. 1995, vol. 34; pp. 4185-4194.

Matay, Ladislav and Andok, Róbert; "Planarization of Microelectronic Structures by Using Polyimides"; Journal of Electrical Engineering; vol. 53, No. 3-4; pp. 86-90.

* cited by examiner

DISPLAY APPARATUS AND METHOD FOR MANUFACTURING THE SAME

CROSS-REFERENCE TO RELATED APPLICATIONS

This U.S. non-provisional patent application claims priority under 35 U.S.C. § 119 to Korean Patent Application No. 10-2017-0100552, filed on Aug. 8, 2017, the entire contents of which are hereby incorporated by reference.

BACKGROUND

The present disclosure herein relates to a display apparatus and a method for manufacturing the same, and more particularly, to a display apparatus that is reduced in manufacturing cost and a method for manufacturing the same.

Display apparatus have been in the spotlight as next-generation high-tech display devices because of low power consumption, good portability, and high added value. Such a display apparatus may include a thin film transistor for tuning on/off each pixel.

The display apparatus may include a display panel and a backlight unit providing light to the display panel. The backlight unit may include a light source and a light guide plate. Light generated from the light source is guided to the inside of the light guide plate and then provided to the display panel.

SUMMARY

The present disclosure provides a display apparatus having improved display quality.

The present disclosure also provides a method for manufacturing a display apparatus that is reduced in manufacturing cost.

An embodiment of the inventive concept provides a display apparatus includes: a display module on which a display area and a non-display area configured to surround the display area; and a backlight unit providing light to the display module, wherein the display module includes: an upper substrate including a wire layer configured to polarize the incident light; a lower substrate including a plurality of pixel electrodes and a common electrode line; and a liquid crystal layer disposed between the upper substrate and the lower substrate, wherein the wire layer includes: a plurality of wire parts disposed on the display area to extend in one direction and spaced apart a predetermined distance from each other in a direction crossing the one direction; and an electrode part connected to the wire parts on the non-display area and electrically connected to the common electrode line.

The electrode part may have a frame shape, and both ends of each of the wire parts may be connected to the electrode part.

The liquid crystal layer may include a plurality of liquid crystal molecules driven by vertical electric fields generated between the wire layer and the pixel electrodes.

The wire parts and the electrode part may be formed of a same material and be formed in one piece.

The display module may further include a conductive material overlapping the non-display area and disposed between the upper substrate and the lower substrate, and the conductive material may be configured to connect the common electrode line to the electrode part.

The conductive material may be provided in plurality, and the plurality of conductive materials may be disposed to be spaced apart from each other.

The conductive material may have a frame shape.

The display module may further include a sealing layer overlapping the non-display area and configured to couple the upper substrate to the lower substrate, and the sealing layer may be disposed outside the conductive material on the non-display area.

The display module may further include a sealing layer overlapping the non-display area and configured to couple the upper substrate to the lower substrate, and the sealing layer may be disposed inside the conductive material on the non-display area.

The display module may further include an alignment layer disposed on the wire parts to cover grooves between the wire parts.

The upper substrate may further include: a first substrate; and a filter layer disposed on the first substrate, wherein the filter layer may include a plurality of conversion filters configured to convert a wavelength of the incident light.

The filter layer may further include an overcoating layer disposed on the conversion filters to cover the conversion filters, and the upper substrate may further include a first inorganic layer disposed between the overcoating layer and the wire layer.

The backlight unit may generate first light, and the conversion filters may include: a first conversion filter configured to convert the first light into second light; and a second conversion filter configured to convert the first light into third light.

The first conversion filter may include a plurality of first quantum dots, the second conversion filter may include a plurality of second quantum dots, and each of the first quantum dots may have a size greater than that of each of the second quantum dots.

The wire layer may be made of a metal.

In an embodiment of the inventive concept, a display apparatus includes: a display module on which a display area and a non-display area configured to surround the display area; and a backlight unit providing light to the display module, wherein the display module includes: an upper substrate including a wire layer configured to receive a constant voltage, the wire layer including a plurality of wire parts configured to polarize the incident light and spaced a predetermined distance from each other; a lower substrate including a plurality of pixel electrodes disposed on the display area; and a liquid crystal layer disposed between the upper substrate and the lower substrate.

The liquid crystal layer may include a plurality of liquid crystal molecules driven by vertical electric fields generated between the wire layer and the pixel electrodes.

The lower substrate may further include a common electrode line disposed on the non-display area, and the common electrode line may be electrically connected to the wire layer.

The wire layer may further include an electrode part connected to the wire parts and electrically connected to the common electrode line on the non-display area.

In an embodiment of the inventive concept, a method for manufacturing a display apparatus includes: forming an array layer including a pixel electrode and a common electrode line on a first substrate; forming a filter layer on a second substrate; forming a first polarization layer on the filter layer after forming the filter layer; forming a liquid crystal layer between the first substrate and the second substrate; forming a conductive material between the first substrate and the second substrate; and coupling the first substrate to the second substrate, wherein the forming of the first polarization layer includes: forming a first inorganic layer and a metal layer on the filter layer; and etching only a portion of the metal layer to from a wire layer, wherein a plurality of slits are formed in the wire layer by the etching process, and the conductive material electrically connects the wire layer to the common electrode line.

The forming of the wire layer may include: forming a second inorganic layer on the metal layer; forming an organic layer on the second inorganic layer; and patterning the organic layer; and etching the second inorganic layer and the metal layer.

Each of the plurality of slits may have a rod shape that extends in a predetermined direction.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
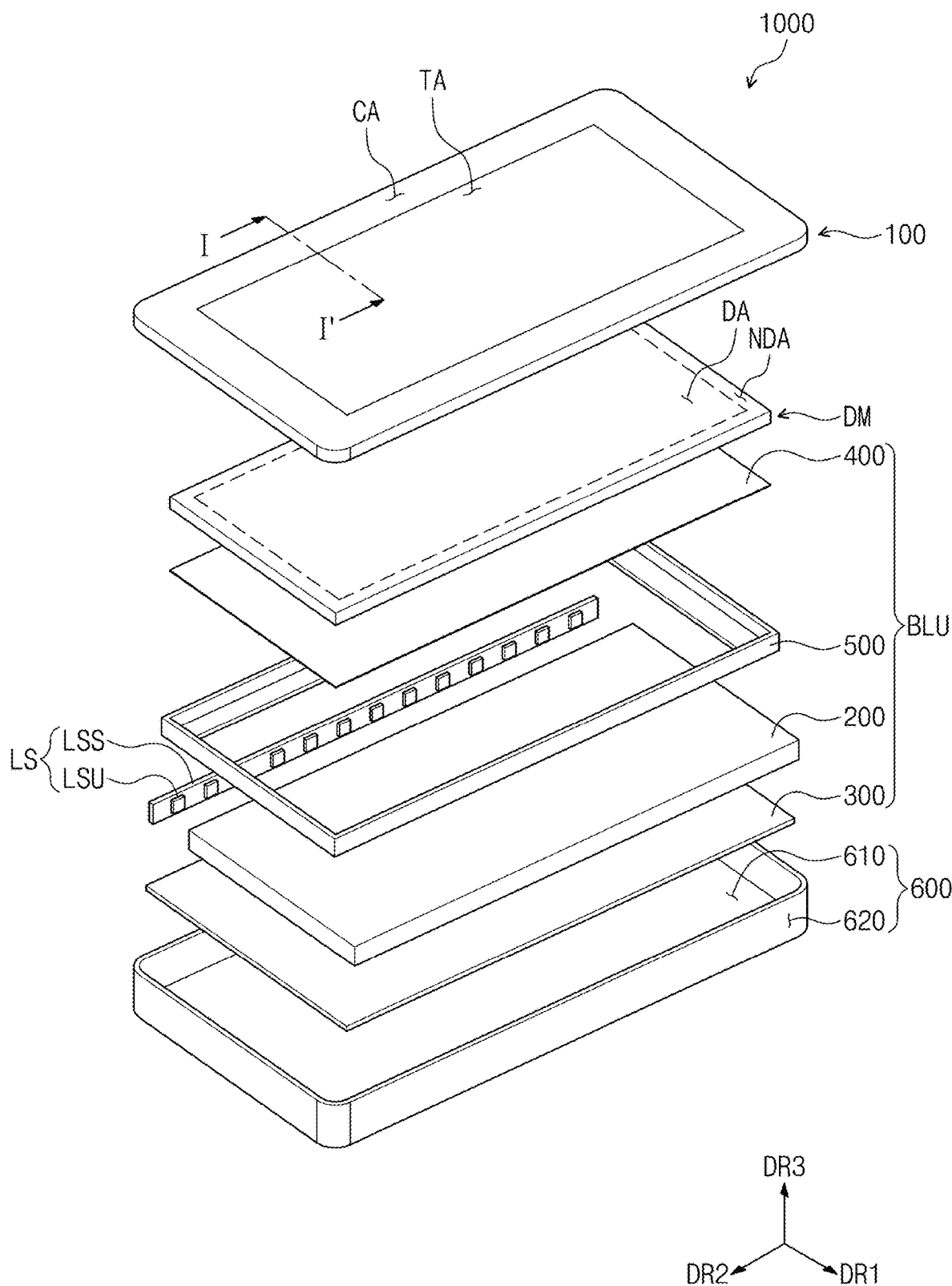
FIG. 1 is an exploded perspective view of a display apparatus according to an embodiment of the inventive concept.

Advantages and features of the inventive concept, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the present disclosure is only defined by scopes of claims. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the inventive concept. Like reference numerals refer to like elements throughout.

It will be understood that although the terms of first and second are used herein to describe various elements and/or sections, these elements and/or sections should not be limited by these terms. These terms are only used to distinguish one element, component, or section from another element, component, or section. Accordingly, a first element, a first component, or a first section that will be described below may be a second element, a second component, or a second section within the technical idea of the present disclosure.

The embodiment in the detailed description will be described with schematic cross-sectional views and/or plan views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the inventive concept.

Hereinafter, exemplary embodiments of the inventive concept will be described below in more detail with reference to the accompanying drawings.

Figure 2:
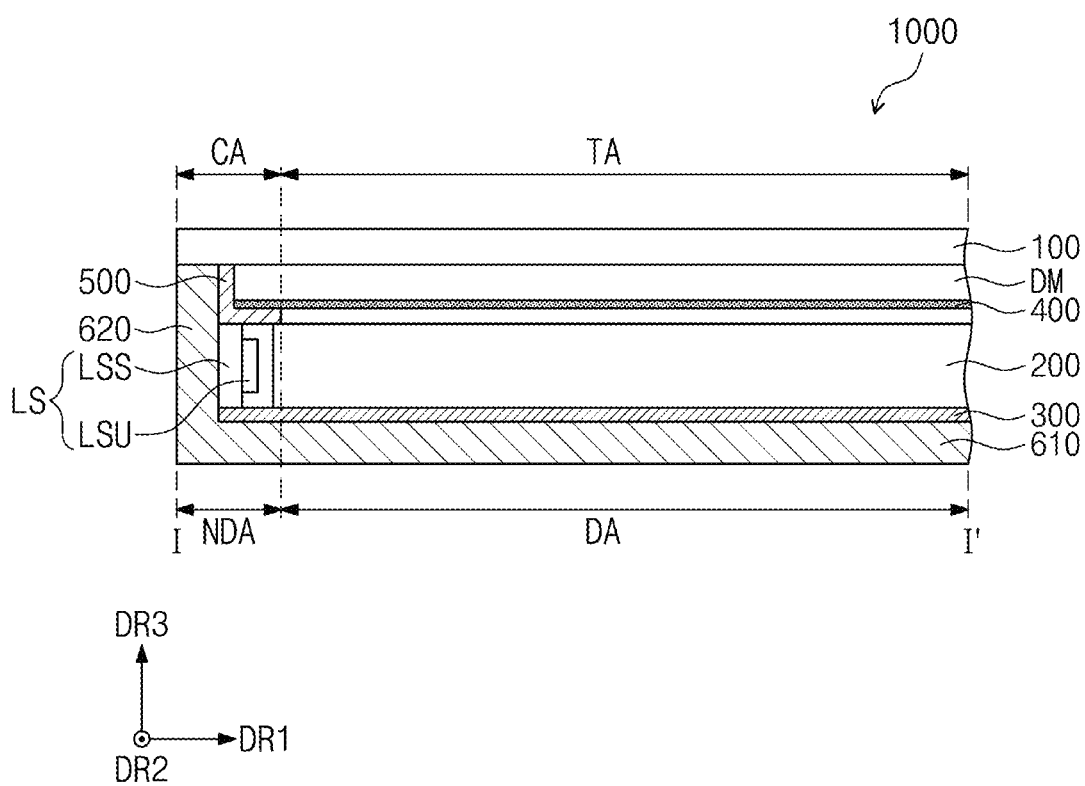
FIG. 2 is a cross-sectional view taken along line I-I' of FIG. 1.

FIG. 1 is an exploded perspective view of a display apparatus according to an embodiment of the inventive concept, and FIG. 2 is a cross-sectional view taken along line I-I' of FIG. 1.

Referring to FIGS. 1 and 2, a display apparatus 1000 according to an embodiment of the inventive concept has a rectangular shape with a short side in a first direction DR1 and a long side in a second direction DR2. However, a display apparatus 1000 according to another embodiment of the inventive concept is not limited to the above-described shape and thus may have various shapes.

The display apparatus 1000 includes a window 100, a display module DM, a backlight unit BLU, and a container 600.

For convenience of description, a direction in which an image is provided from the display apparatus 1000 may be defined as an upward direction, and a direction opposite to the upward direction may be defined as a downward direction. In this embodiment, the upward and downward directions are parallel to a third direction DR3 that is defined to be perpendicular to the first and second directions DR1 and DR2. The third direction DR3 may be a reference direction for dividing front and rear surfaces of components that will be described below. However, the upward direction and the downward direction may be a relative concept, and thus be changed into different directions.

The window 100 may include a light transmitting part TA that transmits an image provided from the display module DM and a light blocking part CA through which the image is not transmitted. The light transmitting part TA is disposed on a central portion of the display apparatus 1000 on a plane defined in the first and second directions DR1 and DR2. The light blocking part CA is disposed around the light transmitting part TA and has a frame shape surrounding the light transmitting part TA.

A display area DA on which an image is displayed and a non-display area NDA on which the image is not displayed are defined on the plane on the display module. The display area DA may be defined at a center of the display module DM on the plane to overlap the light transmitting part TA of the window 100. Hereinafter, the display module DM will be described in more detail with reference to FIG. 3.

The backlight unit BLU may be disposed under the display module DM to provide light the display module DM. According to this embodiment, the backlight unit BLU may be an edge-type backlight unit.

The backlight unit BLU includes a light source LS, a light guide plate 200, a reflection sheet 300, an optical sheet 400, and a mold frame 500.

The light source LS is disposed at one side of the light guide plate 200 in the first direction DR1. However, an embodiment of the inventive concept is not limited to the position of the light source LS. For example, the light source LS may be disposed adjacent to at least one side surface of side surfaces of the light guide plate 200.

The light source LS includes a plurality of light source units LSU and a light source substrate LSS. The light source units LSU generates light to be provided to the display module DM to provide the generated light to the light guide plate 200.

According to this embodiment, the light source units LSU may generate first light. For example, the first light may have a wavelength band of about 400 nm to about 500 nm. That is, the light source units LSU may substantially generate blue light.

According to this embodiment, each of the light source units LSU may have a structure in which a light emitting diode (LED) is used as a point light source. However, an embodiment of the inventive concept is not limited to the kind of light source units LSU.

Also, an embodiment of the inventive concept is not limited to the number of light source units LSU. According to another embodiment of the inventive concept, the light source unit LSU may not be provided in plurality, but be provided as one point light source using the LED. Alternatively, the light source units LSU may be provided with a plurality of LED groups. Also, according to another embodiment of the inventive concept, the light source units LSU may be a line light source.

The light source units LSU may be mounted on the light source substrate LSS. The light source substrate LSS may be disposed to face the one side of the light guide plate 200 in the first direction DR1 to extend in the second direction DR2. The light source substrate LSS may include a light source controller (not shown) connected to the light source units LSU. The light source controller (not shown) may analyze an image displayed on the display module DM to output a local dimming signal and control luminance of light generated by the light source LS in response to the local dimming signal. According to another embodiment of the inventive concept, the light source controller (not shown) may be mounted on a separate circuit board. Here, an embodiment of the inventive concept is not limited to the mounted position of the light source controller.

The light guide plate 200 is disposed below the display module DM. The light guide plate 200 may have a plate shape. The light guide plate 200 may change a traveling direction of the light provided from the light source LS so that the light travels in the upward direction in which the display module DM is disposed. Although not shown, the light guide plate 200 may include a diffusion pattern (not shown) disposed on a top surface of the light guide plate 200.

The light guide plate 200 may include a material having high light transmittance in a visible light region. For example, the light guide plate 200 may be made of a transparent polymer resin such as polycarbonate or polymethyl methacrylate. Also, a light guide plate 200 according to another embodiment of the inventive concept may be made of a glass material.

The reflection sheet 300 may be disposed below the light guide plate 200. The reflection sheet 300 reflects the light emitted to a lower side of the light guide plate 200 so that the light is emitted upward. The reflection sheet 300 reflects the light emitted to a lower side of the light guide plate 200 so that the light is emitted upward.

The reflective sheet 300 includes a light reflecting material. For example, the reflection sheet 300 may be made of aluminum or silver.

The optical sheet 400 is disposed between the light guide plate 200 and the display module DM. Light provided from the light guide plate 200 to the optical sheet 400 may be diffused and collected by the optical sheet 400 and then provided to the display module DM.

Although not shown, the optical sheet 400 according to an embodiment of the inventive concept may include a plurality of sheets. Particularly, the optical sheet 400 may include a diffusion sheet, a prism sheet, and a protection sheet. The diffusion sheet may diffuse the light provided from the light guide plate 200. The prism sheet may be disposed above the diffusion sheet to collect the light diffused by the diffusion sheet in an upward direction perpendicular to the plane. The protection sheet may protect prisms of the prism sheet against external friction. An embodiment of the inventive concept is not limited to the kind and number of sheets provided in the optical sheet 400.

The mold frame 500 is disposed between the light guide plate 200 and the optical sheet 400. In this embodiment, the mold frame 500 has a frame shape. Particularly, the mold frame 500 may be disposed to correspond to an edge area on the top surface of the light guide plate 200. The display module DM and the optical sheet 400 may be seated on the mold frame 500. The mold frame 500 may fix the display module DM, the optical sheet 400, and the backlight unit BLU.

The container 600 accommodates the backlight unit BLU. The container 600 includes a bottom part 610 and a plurality of sidewalls 620 connected to the bottom part 610. According to an embodiment of the inventive concept, the light source LS may be disposed on one inner surface of the plurality of sidewalls of the container 600. The container 600 may be made of a metal having rigidity.

Figure 3:
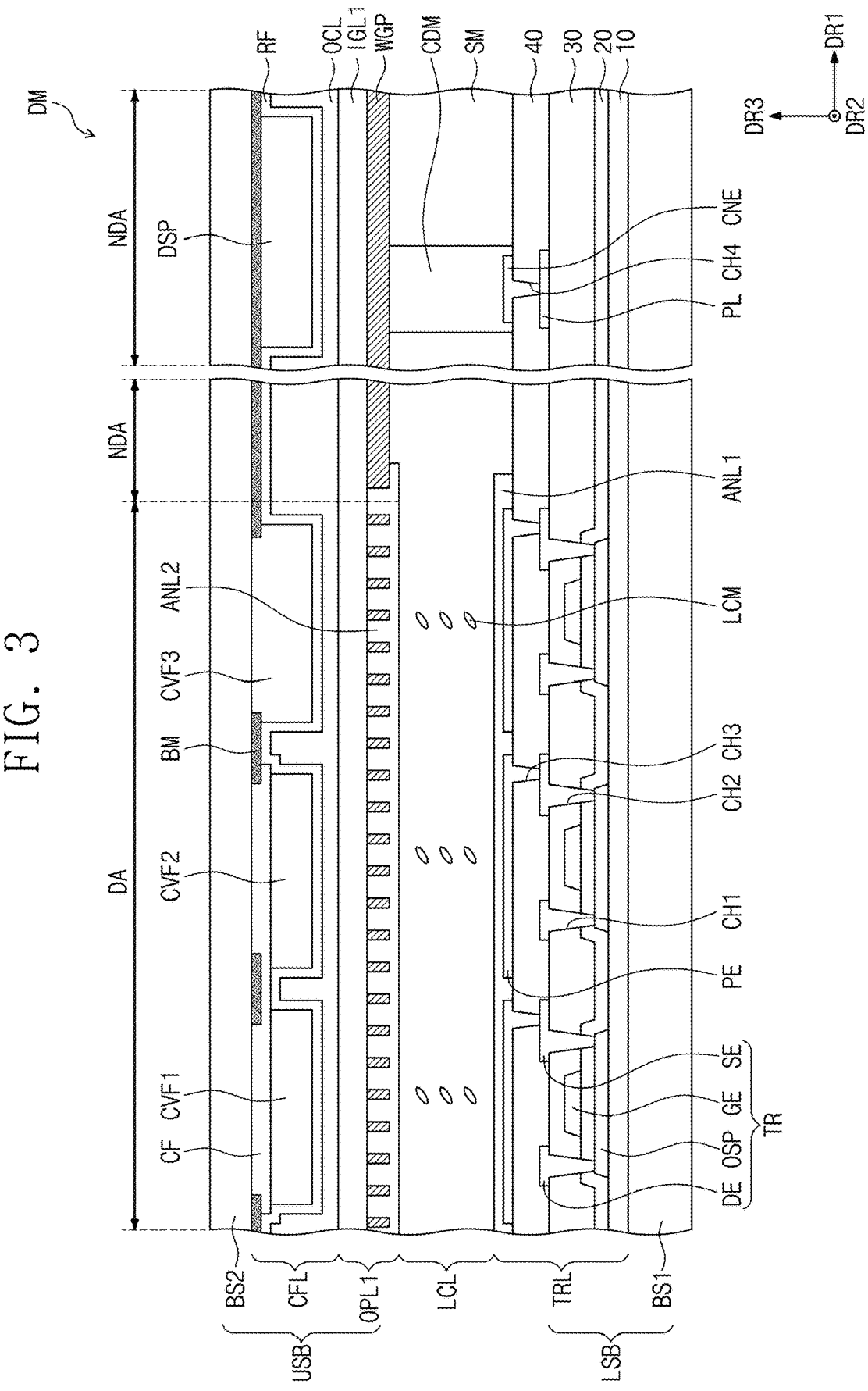
FIG. 3 is an enlarged view illustrating a display module of FIG. 2.
Figure 4:
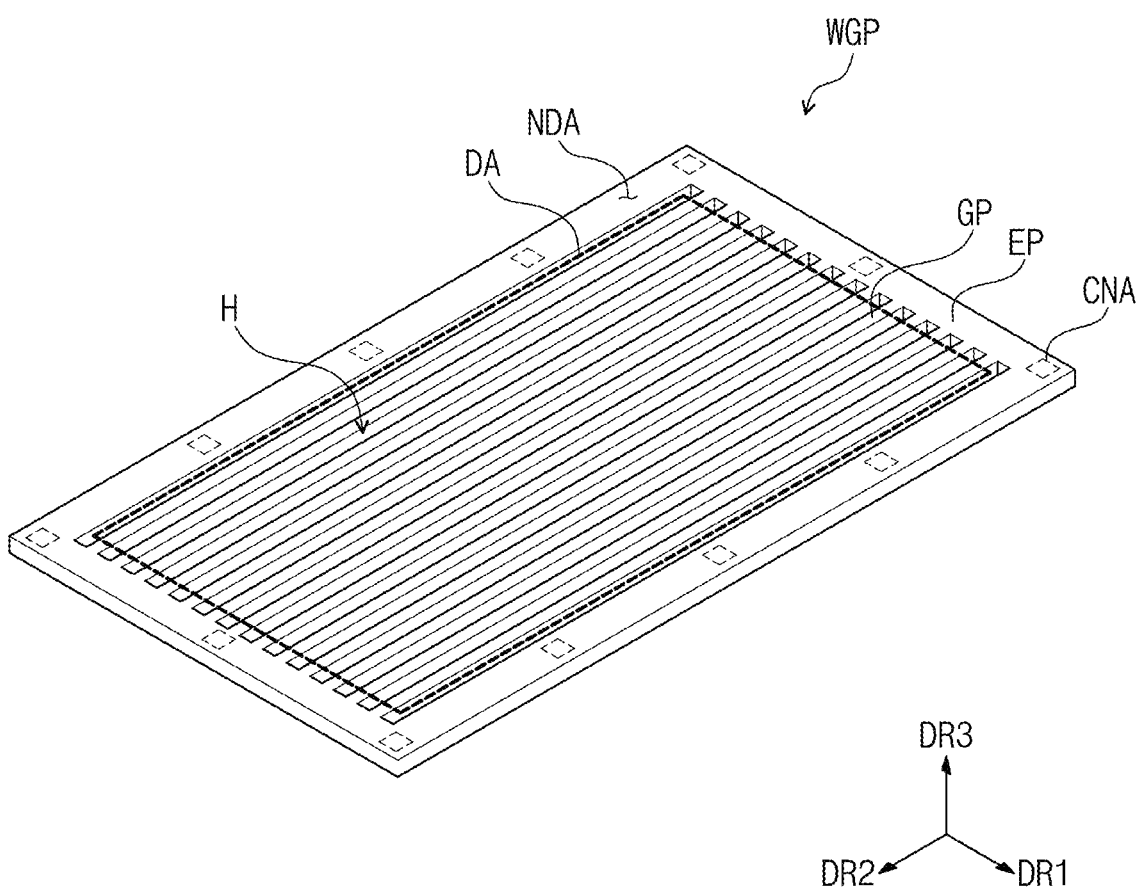
FIG. 4 is a perspective view of a wire layer according to an embodiment of the inventive concept.

FIG. 3 is an enlarged view illustrating the display module of FIG. 2, and FIG. 4 is a perspective view of a wire layer according to an embodiment of the inventive concept.

Referring to FIGS. 3 and 4, the display module DM according to an embodiment of the inventive concept displays an image through the display area DA. The display module DM may be a light-receiving type display panel. For example, according to an embodiment of the inventive concept, the display module DM may be a liquid crystal display panel.

The display module DM includes a lower substrate LSB, an upper substrate USB, and a liquid crystal layer LCL.

The lower substrate LSB is disposed above the backlight unit BLU. The lower substrate LSB includes a first substrate BS1 and an array layer TRL.

The first substrate BS1 may be made of a material having high light transmittance to easily transmit light provided from the backlight unit BLU. The first substrate BS1 may include a transparent glass substrate, a transparent plastic substrate, or a transparent film.

The array layer TRL is disposed on the first substrate BS1. The array layer TRL includes a buffer layer 10, a first insulation layer 20, a second insulation layer 30, a third insulation layer 40, a plurality of transistors TR, a first alignment layer ANL1, a common electrode line PL, and a connection electrode CNE. An embodiment of the inventive concept is not particularly limited to a material of the first to third insulation layers 20, 30, and 40. According to an embodiment of the inventive concept, the buffer layer 10 may be selectively disposed or omitted.

Although the plurality of transistors TR are illustrated in FIG. 3, since the transistors TR have the same constituent, for convenience of description, only one transistor TR will be exemplified below.

Each of the transistors TR includes a semiconductor pattern OSP, a control electrode GE, an input electrode DE, and an output electrode SE. The transistors TR are disposed on the display area DA.

The semiconductor pattern OSP of the transistor TR is disposed on the buffer layer 10. The first insulation layer 20 is disposed on the semiconductor pattern OSP. The control electrode GE of the transistor TR is disposed on the first insulation layer 20. The control electrode GE may be manufactured through a photolithography process.

The second insulation layer 30 covering the control electrode GE is disposed on the first insulation layer 20. The common electrode line PL and the input electrode DE and output electrode SE of the transistor TR are disposed on the second insulation layer 30. The input electrode DE and the output electrode SE are spaced apart from each other.

The input electrode DE and the output electrode SE may be connected to the semiconductor pattern OSP through first and second contact holes CH1 and CH2, which respectively pass through the first and second insulation layers 20 and 30.

Although the transistor TR has a top gate structure, in which the control electrode GE is disposed above the semiconductor pattern OSP, in FIG. 3, an embodiment of the inventive concept is not limited thereto. For example, according to another embodiment of the inventive concept, the transistor TR may be changed to have a bottom gate structure in which the control electrode GE is disposed below the semiconductor pattern OSP.

The third insulation layer 40 covering the input electrode DE and the output electrode SE is disposed on the second insulation layer 30. The third insulation layer 40 may provide planar surface.

A pixel electrode PE is disposed on the third insulation layer 40. The pixel electrode PE is connected to the output electrode SE through a third contact hole CH3 passing through the third insulation layer 40.

A first alignment layer ANL1 is disposed on the pixel electrode PE. The first alignment layer ANL1 may be disposed to entirely overlap the display area DA. The first alignment layer ANL1 may align liquid crystal molecules of the liquid crystal layer LCL disposed on the first alignment layer ANL1 in a predetermined direction.

The common electrode line PL is disposed on the non-display area NDA. The common electrode line PL is disposed on the second insulation layer 30. That is, the common electrode line PL is disposed on the same layer as the input and output electrodes DE and SE of the transistor TR. However, according to another embodiment of the inventive concept, the common electrode line PL may be disposed on a layer different from the second insulation layer 30. For example, the common electrode line PL may be disposed on the third insulation layer 40.

A connection electrode CNE is disposed on the third insulation layer 40. The connection electrode CNE is connected to the common electrode line PL through a fourth contact hole CH4 passing through the third insulation layer 40. According to another embodiment of the inventive concept, when the common electrode line PL is disposed on the third insulation layer 40, the connection electrode CNE may be omitted.

The upper substrate USB includes a second substrate BS2, a filter layer CFL, and a first polarization layer OPL1.

The second substrate BS2 may be made of a material having high transmittance. The second substrate BS2 may include a transparent glass substrate, a transparent plastic substrate, or a transparent film.

The filter layer CFL is disposed below the second substrate BS2. The filter layer CFL includes a light blocking layer BM, a plurality of conversion filters CVF1, CVF2, and CVF3, a color filter CF, a reflection layer RF, and an overcoating layer OCL.

The light blocking layer BM is disposed on a rear surface of the second substrate BS2. An area exposed by the light blocking layer BM may be defined as a pixel area (not shown). The light blocking layer BM may prevent light leakage to areas except for the pixel area (not shown) from occurring and clearly distinguish a boundary between the pixel areas adjacent to each other. The pixel area (not shown) is defined on the display area DA.

The light blocking layer BM may be made of a light blocking material. According to this embodiment, the light blocking layer BM may be made of a metal material.

The conversion filters CVF1, CVF2, and CVF3 may be disposed to overlap the pixel area (not shown). Light incident into the conversion filters CVF1, CVF2, and CVF3 may be realized as images having various colors by the conversion filters CVF1, CVF2, and CVF3.

Each of the conversion filters CVF1, CVF2, and CVF3 may include a plurality of conversion particles. Each of the conversion particles may absorb at least a portion of the incident light to emit light having a special color or transmit the light as it is.

When light incident into the conversion filters CVF1, CVF2, and CVF3 has sufficient energy for exciting the conversion particles, the conversion particles may absorb at least a portion of the incident light and then excited and stabilized to emit light having a special color. On the other hand, when the incident light has energy that is difficult to excite the conversion particles, the incident light may pass through the conversion filters CVF1, CVF2, and CVF3 as it is and thus be seen from the outside.

Particularly, light emitted by the conversion particles may determine color according to a size of each of the conversion particles. Substantially, as each of the particles increases, light having a longer wavelength is generated. Also, as each of the particles decreases, light having a shorter wavelength is generated.

According to this embodiment, each of the conversion particles may be a quantum dot. Light emitted from the conversion particles of the conversion filters CVF1, CVF2, and CVF3 may be emitted in various directions.

According to an embodiment of the inventive concept, each of the conversion filters CVF1, CVF2, and CVF3 includes a first conversion filter CVF1, a second conversion filter CVF2, and a third conversion filter CVF3. The light blocking layer BM may be disposed between the first to third conversion filters CVF1 to CVF3 to define boundaries between the first to third conversion filters CVF1 to CVF3.

The first conversion filter CVF1 and the second conversion filter CVF2 converts light incident into the conversion filters into light having wavelength bands different from each other.

According to this embodiment, the first conversion filter CVF 1 may absorb the first light and convert the first light into second light. For example, the second light may have a wavelength band of about 640 nm to about 780 nm. That is, the first conversion filter CVF1 may substantially convert blue light into red light.

The second conversion filter CVF2 may absorb the first light and convert the first light into third light. For example, the third light may have a wavelength band of about 480 nm to about 560 nm. That is, the second conversion filter CVF2 may substantially convert blue light into green light.

According to this embodiment, each of the first and second conversion filters CVF1 and CVF2 may have a thickness of about 5.5 µm to about 6.5 µm.

The third conversion filter CVF3 may be a colorless filter or a gray filter. When the light source units LSU of the light source LS generate light having a blue color, the third conversion filter CVF3 may transmit incident light as it is without converting a color of the incident light. Here, when the third conversion filter CVF3 is capable of transmitting at least a portion of light incident into the third conversion filter CVF3, the third conversion filter CVF3 may be made of various materials, and also, an embodiment of the inventive concept is not limited to the materials. According to another embodiment of the inventive concept, the third conversion filter CVF3 may be omitted. In this case, the third conversion filter CVF3 may have a thickness of about 6.5 µm to about 7.5 µm.

As described above, a wavelength of light generated may be determined by the quantum dots included in a conversion filter. According to this embodiment, the first conversion filter CVF1 may include first conversion particles, and the second conversion filter may include second conversion particles. The third conversion filter may include third conversion particles. According to this embodiment, each of the first conversion particles may have a size greater than that of each of the second conversion particles.

According to another embodiment of the inventive concept, the third conversion filter CVF3 may not include the third conversion particles.

The color filter CF may be disposed between each of the conversion filters CVF1 and CVF2, and the second substrate BS2. The color filter CF is disposed to overlap the first conversion filter CVF1 and the second conversion filter CVF2 in a plan view. The color filter CF absorbs the first light and transmits the second light and the third light. Thus, when a portion of the first light incident into the first conversion filter CVF1 is not converted into the second light and is incident into the color filter CF, the portion of the first light which in not converted into the second light is absorbed by the color filter CF. When a portion of the first light incident into the second conversion filter CVF2 $t$ is not converted into the third light and is incident into the color filter CF, the portion of the first light which in not converted into the third light is absorbed by the color filter CF.

According to this embodiment, the color filter CF may be made of an organic material. Also, the color filter CF may have a predetermined color. For example, the color filter CF may be a yellow color filter that absorbs blue light.

In this embodiment, although one color filter CF overlaps all of the first conversion filters CVF1 and the second conversion filter CVF2, an embodiment of the inventive concept is not limited thereto. For example, according to another embodiment of the inventive concept, two color filters CF may be disposed to one-to-one correspond to the first conversion filter CVF1 and the second conversion filter CVF2. In this case, the color filters CF may have colors different from each other.

In this embodiment, the color filter CF has a thickness of about 0.8 µm to about 1.2 µm.

The reflection layer RF may be further disposed on the conversion filters CVF1, CVF2, and CVF3. The reflection layer RF may transmit the first light and reflect the second light and the third light. For example, the reflection layer RF may be a selective transmission-reflection layer. The reflection layer RF may be provided as a single layer or a multilayer in which a plurality of insulation layers having reflective indexes different from each other are laminated. In this embodiment, the reflection layer RF has a thickness of about 1.0 µm to about 1.2 µm. In another embodiment of the inventive concept, the reflection layer RF may be omitted.

The overcoating layer OCL is disposed on the reflection layer RF to cover the conversion filters CVF1, CVF2, and CVF3 and the reflection layer RF. The overcoating layer OCL may protect the conversion filters CVF1, CVF2, and CVF3 and the reflection layer RF. Also, the overcoating layer OCL may serve as a planarization layer. For example, a distance from a top surface of the reflection layer RF to a top surface of the overcoating layer OCL may range of about 5 µm to about 10 µm.

According to an embodiment of the inventive concept, the filter layer CFL may further include a dummy filter DSP disposed on the non-display area NDA. The dummy filter DSP may be disposed on the light blocking layer BM on the non-display area NDA. The dummy filter DSP is disposed to compensate the stepped portion generated by the conversion filters CVF1, CVF2, and CVF3 disposed on the display area DA. According to another embodiment of the inventive concept, the dummy filter DSP may be omitted.

A first polarization layer OPL1 is disposed on the filter layer CFL. The first polarization layer OPL1 includes a first inorganic layer IGL1, a wire layer WGP, and a second alignment layer ANL2.

The first inorganic layer IGL1 is disposed on the overcoating layer OCL of the filter layer CFL. The first inorganic layer IGL1 may be a base layer of the wire layer WGP. The first inorganic layer IGL1 isolates the overcoating layer OCL from the wire layer WGP.

The wire layer WGP is disposed on the first inorganic layer IGL1. The wire layer WGP polarizes components of incident light. In this embodiment, the wire layer WGP may be made of a metal. For example, the wire layer WGP may be made of aluminum. In this embodiment, the wire layer WGP has a thickness of about 1,800 Å to about 2,200 Å.

The wire layer WGP includes a plurality of wire parts GP and an electrode part EP. The wire parts GP overlap the display area DA. The electrode part EP overlaps the non-display area NDA.

The wire parts GP extend in one direction. For example, as illustrated in FIG. 4, each of the wire parts GP has a rod shape. Particularly, each of the wire parts GP extends in the second direction DR2 and are arranged to be spaced a predetermined distance apart from each other in the first direction DR1. The space between the wire parts GP may be less than a wavelength of visible light. For example, a space between the wire parts GP may be less than about 100 nm.

Each of the wire parts GP may be a wire grid polarizer. That is, each of the wire parts GP has a predetermined absorption axis.

The electrode part EP has a frame shape. At least one contact area CNA may be defined on a top surface of the electrode part EP. A conductive material CDM that will be described later may be disposed on the contact area CNA.

An inner surface of the electrode part EP is connected to both ends of each of the wire parts GP. The electrode part EP and the wire parts GP may be formed of a same material and be formed in one piece. Thus, the wire layer WGP may have a shape in which a plurality of slits H extending in the second direction DR2 is defined in the display area DA.

The second alignment layer ANL2 is disposed on the wire layer WGP. The second alignment layer ANL2 covers the wire parts GP. The second alignment layer ANL2 entirely overlaps the display area DA.

A liquid crystal layer LCL is disposed between the first alignment layer ANL1 of the lower substrate LSB and the second alignment layer ANL2 of the upper substrate USB. The liquid crystal layer LCL includes a plurality of liquid crystal molecules LCM arranged in a predetermined direction.

The display module DM according to this embodiment further includes a sealant SM disposed on the same plane as the liquid crystal layer LCL and at least one conductive material CDM.

The sealant SM is disposed on the same layer as the liquid crystal layer LCL to overlap the non-display area NDA. The sealant SM is disposed on an edge of the display module DM and coupled to the upper substrate USB and the lower substrate LSB.

The conductive material CDM is made of a conductive material. The conductive material CDM is disposed between the upper substrate USB and the lower substrate LSB. The conductive material CDM overlaps the non-display area NDA. The conductive material CDM is disposed inside the sealant SM on the non-display area NDA.

As illustrated in FIG. 3 and FIG. 4, in this embodiment, the conductive material CDM may be provided in plurality. The plurality of conductive materials CDM may be disposed to one-to-one correspond to a plurality of contact areas CNA on the electrode part EP of the wire layer WGP.

According to this embodiment, a predetermined voltage may be constantly provided to the wire layer WGP. That is, the wire layer WGP may serve as a common electrode.

Particularly, the conductive material CDM connects the electrode part EP of the wire layer WGP disposed on the upper substrate USB to the connection electrode CNE disposed on the lower substrate LSB. Thus, a common voltage provided to the common electrode line PL may be applied to the connection electrode CNE and the wire layer WGP to generate vertical electric fields between the wire parts GP of the wire layer WGP and the pixel electrode PE.

Thus, the liquid crystal molecules LCM of the liquid crystal layer LCL may alter an arrangement direction by the vertical electric fields generated between the wire parts GP of the wire layer WGP disposed on the upper substrate USB and the pixel electrodes PE disposed on the lower substrate LSB. For example, the liquid crystal molecules LCM of the liquid crystal layer LCL may be alter the arrangement direction by a VA mode or TN mode.

According to this embodiment, the wire layer WGP having a polarization function may serve as the common electrode at the same time. That is, a separate common electrode is not required. Thus, slimming of the display apparatus 1000 may be expected. Also, when the display apparatus 1000 is manufactured, process may be simplified, and manufacturing costs may be reduced. Also, since the laminated structure required for the process of forming the common electrode according to the related art is omitted, the display area DA may be improved in transmittance. That is, the display apparatus 1000 may be improved in display quality.

Although not shown, the display apparatus 1000 according to an embodiment of the inventive concept may further include a second polarization layer (not shown) disposed in a lower portion of the display module DM.

Particularly, the second polarization layer (not shown) is disposed between the display module DM and the backlight unit BLU to polarize components of light provided from the backlight unit BLU. The second polarization layer (not shown) may have a transmission axis (not shown) having a predetermined direction.

An angle between the absorption axis (not shown) of the wire parts GP of the first polarization layer OPL1 and the transmission axis (not shown) of the second polarization layer may be set according to the arrangement direction of the liquid crystal molecules LCM. For example, the absorption axis of the wire parts GP may be perpendicular to the transmission axis of the second polarization layer (not shown) in a plan view.

The second polarization layer may be coupled to the display module DM by using an adhesive.

Also, although not shown, according to another embodiment of the inventive concept, the second polarization layer (not shown) may be disposed in the display module DM. In this case, the second polarization layer (not shown) may be a wire gird polarizer.

Figure 5:
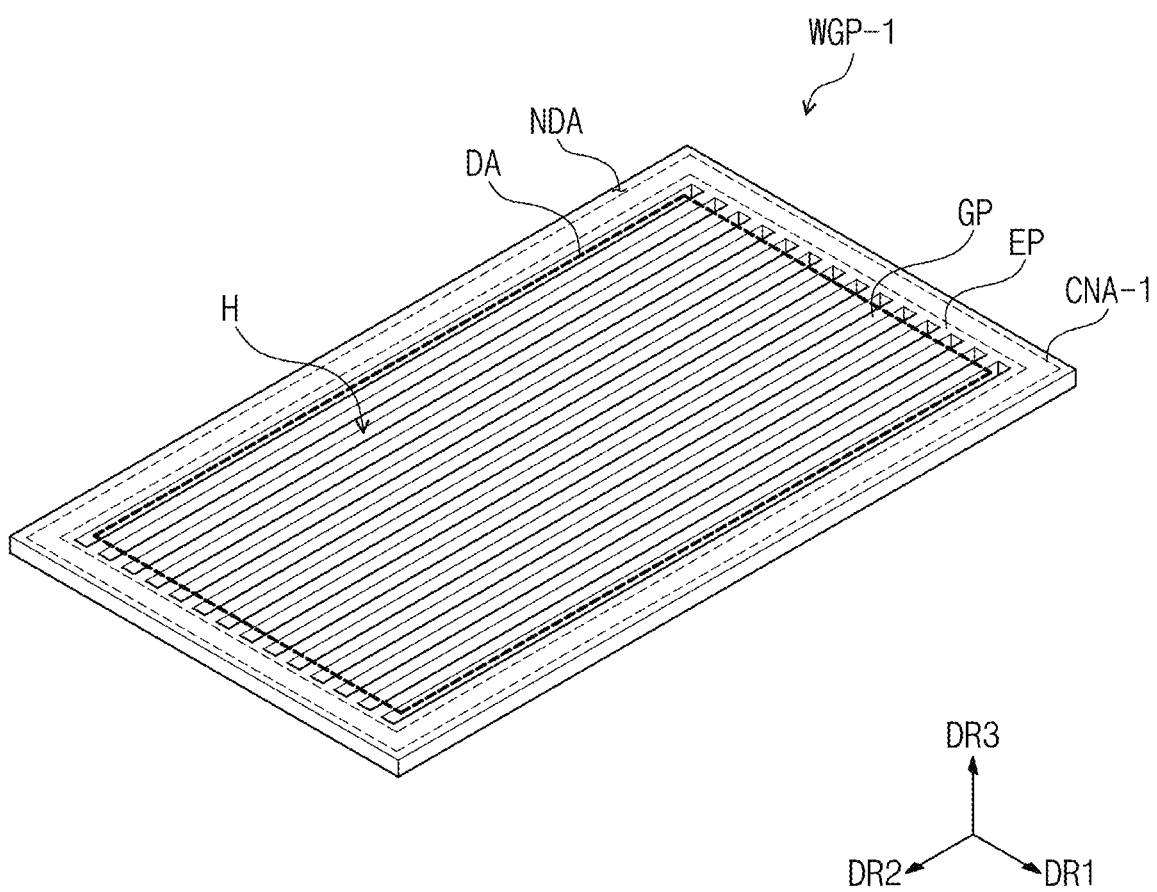
FIG. 5 is a perspective view of a wire layer according to another embodiment of the inventive concept.

FIG. 5 is a perspective view of a wire layer according to another embodiment of the inventive concept.

For convenience of description, differences between this embodiment and the foregoing embodiment will be mainly described, and omitted descriptions will be derived from the foregoing embodiment. Also, the same reference symbol is given to the same component, and duplicated descriptions with respect to the component will be omitted.

Referring to FIG. 5, according to another embodiment of the inventive concept, a contact area CNA-1 is defined on an electrode part EP of a wire layer WGP-1. The contact area CNA-1 has a frame shape surrounding the display area DA on the non-display area NDA. Thus, the conductive material CDM (see FIG. 3) may have a frame shape surrounding the display area DA to correspond to the contact area CNA-1.

Figure 6:
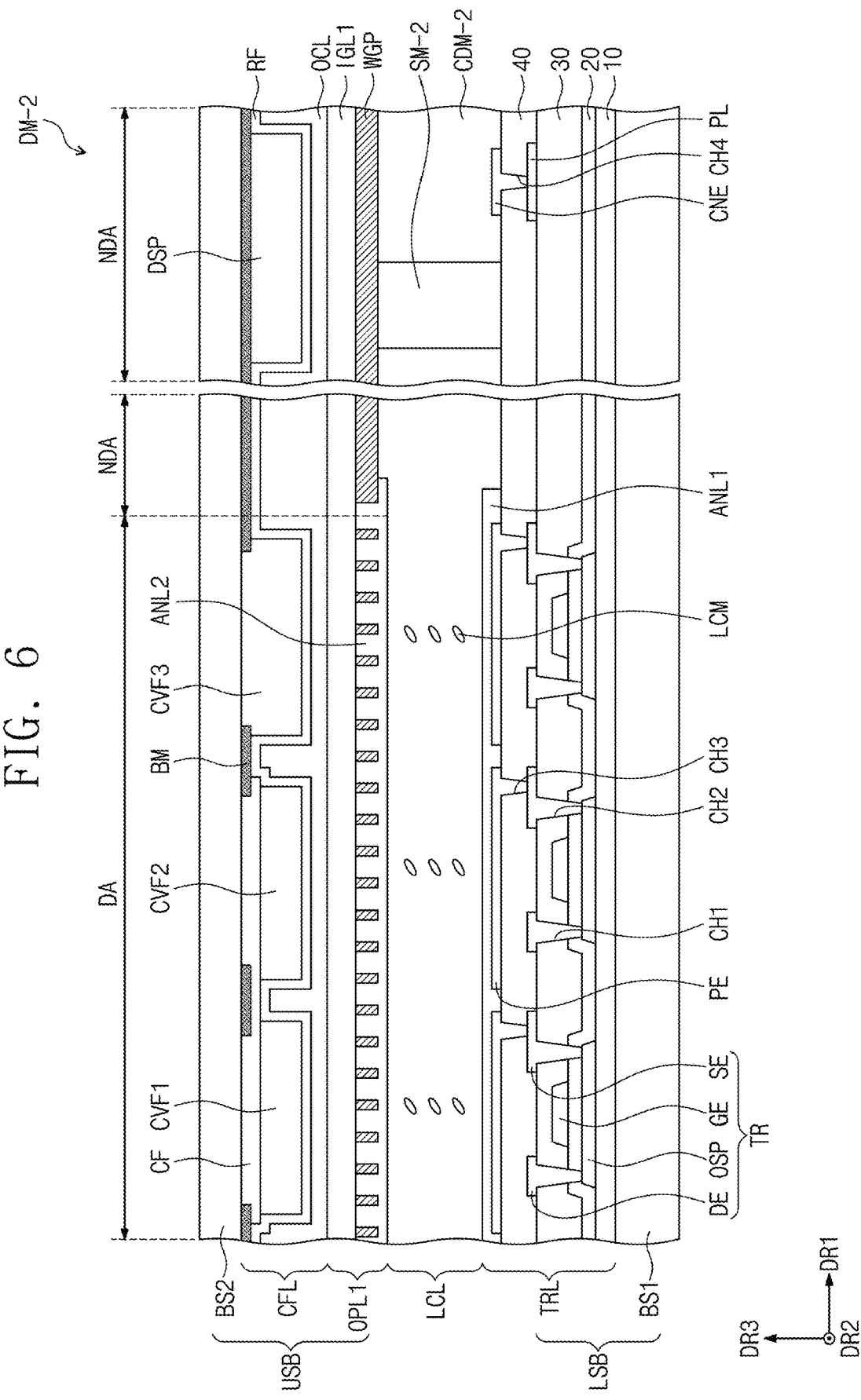
FIG. 6 is an enlarged cross-sectional view of a display module according to another embodiment of the inventive concept.

FIG. 6 is an enlarged cross-sectional view of a display module DM-2 according to another embodiment of the inventive concept.

FIG. 6 is an enlarged cross-sectional view of a display module according to another embodiment of the inventive concept.

For convenience of description, differences between this embodiment and the foregoing embodiment will be mainly described, and omitted descriptions will be derived from the foregoing embodiment. Also, the same reference symbol is given to the same component, and duplicated descriptions with respect to the component will be omitted.

Referring to FIG. 6, a conductive material CDM-2 according to another embodiment of the inventive concept may be disposed outside the sealant SM-2 on the non-display area NDA.

Figure 7:
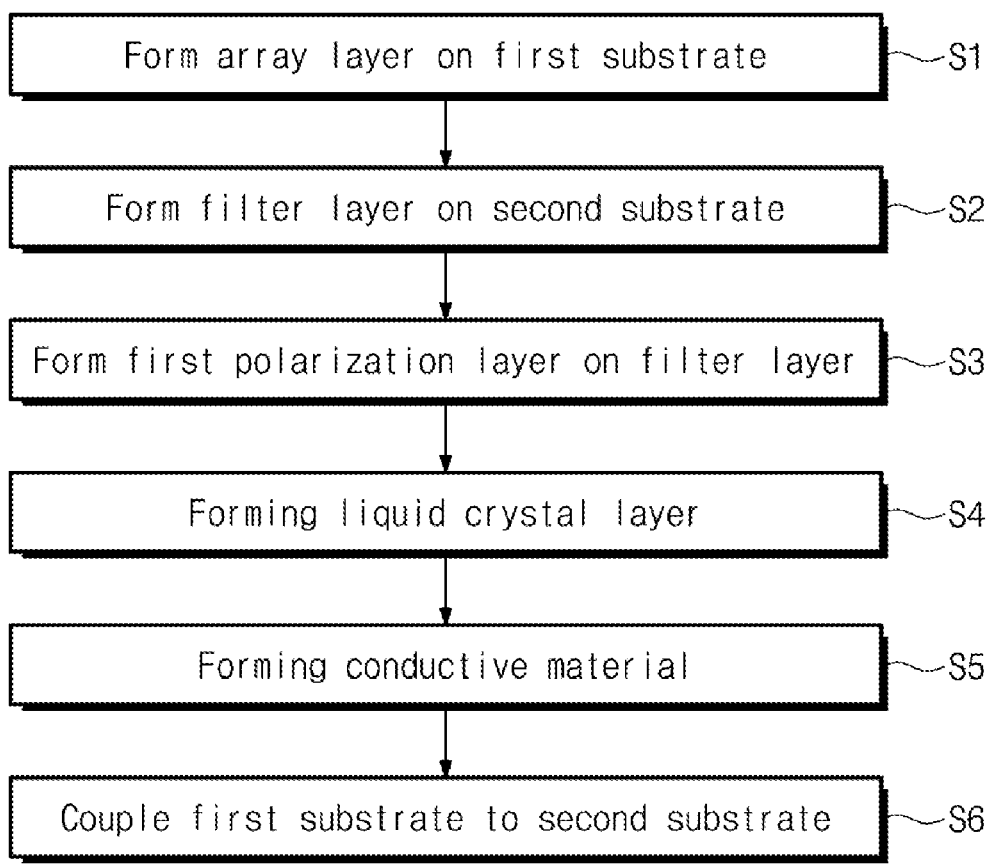
FIG. 7 is a flowchart illustrating a method for manufacturing a display apparatus according to an embodiment of the inventive concept.

FIG. 7 is a flowchart illustrating a method for manufacturing the display apparatus according to an embodiment of the inventive concept.

Referring to FIGS. 3 and 7, the display module of the display apparatus according to an embodiment of the inventive concept may be manufactured in the following order.

First, an upper substrate USB and a lower substrate LSB are formed. The process of forming the lower substrate LSB includes a process (S1) of forming an array layer TRL on a first substrate BS1. The array layer TRL includes a pixel electrode PE and a common electrode line PL.

The process of forming the upper substrate USB includes a process of forming a filter layer CFL and a first polarization layer OPL1 on the second substrate BS2. First, a filter layer CFL is formed on a second substrate BS2 (S2). The filter layer CFL includes a plurality of conversion filters CVF1, CVF2, and CVF3. After the filter layer CFL is formed, a first polarization layer OPL1 is formed on the filter layer CFL (S3). The first polarization layer OPL1 includes a wire layer WGP.

In this embodiment, the lower substrate LSB is formed after the upper substrate USB is formed. However, an embodiment of the inventive concept is not limited to the formation order of the upper substrate USB and the lower substrate LSB. For example, in another embodiment of the inventive concept, the lower substrate LSB is formed before the upper substrate USB is formed.

After the upper substrate USB and the lower substrate LSB are formed, a liquid crystal layer LCL is formed between the upper substrate USB and the lower substrate LSB (S4). The liquid crystal layer LCL overlaps a display area DA.

After the liquid crystal layer LCL is formed, a conductive material CDM is formed (S5). The conductive material CDM overlaps a non-display area NDA. The conductive material CDM is electrically connected to the common electrode line PL of the lower substrate LSB.

After the conductive material CDM is formed, the upper substrate USB and the lower substrate LSB are coupled to each other (S6). The upper substrate USB and the lower substrate LSB may be coupled to each other by forming a sealant SM between the upper substrate USB and the lower substrate LSB.

In this embodiment, the process (S4) of forming the liquid crystal layer LCL may be performed before the process (S5) of forming the conductive material CDM and the process (S6) of coupling the upper substrate USB to the lower substrate LSB. However, an embodiment of the inventive concept is not limited to the formation order of the liquid crystal layer LCL. For example, in another embodiment of the inventive concept, the process (S5) of forming the conductive material CDM and the process (S6) of coupling the upper substrate USB to the lower substrate LSB may be performed before the process of forming the liquid crystal layer LCL.

Figure 8:
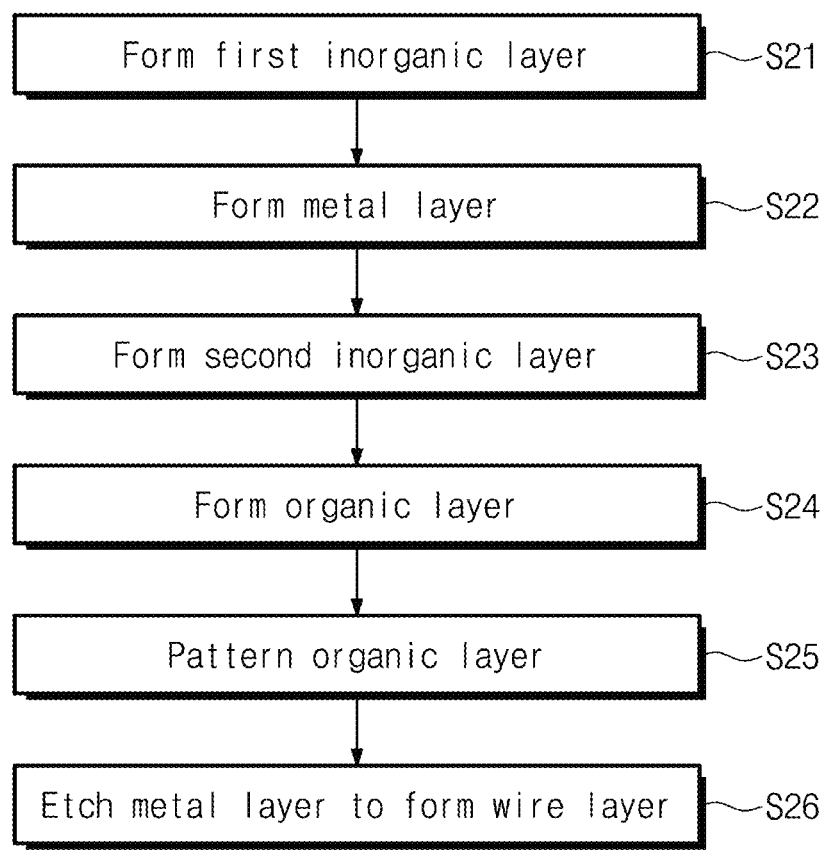
FIG. 8 is a flowchart illustrating a process of forming a first polarization layer of FIG. 7.

FIG. 8 is a flowchart illustrating a process of forming the first polarization layer of FIG. 7. FIGS. 9A to 9E are perspective views illustrating a process of manufacturing the first polarization layer of FIG. 8. FIGS. 10A to 10E are cross-sectional view illustrating a process of forming the first polarization layer.

Figure 9A:
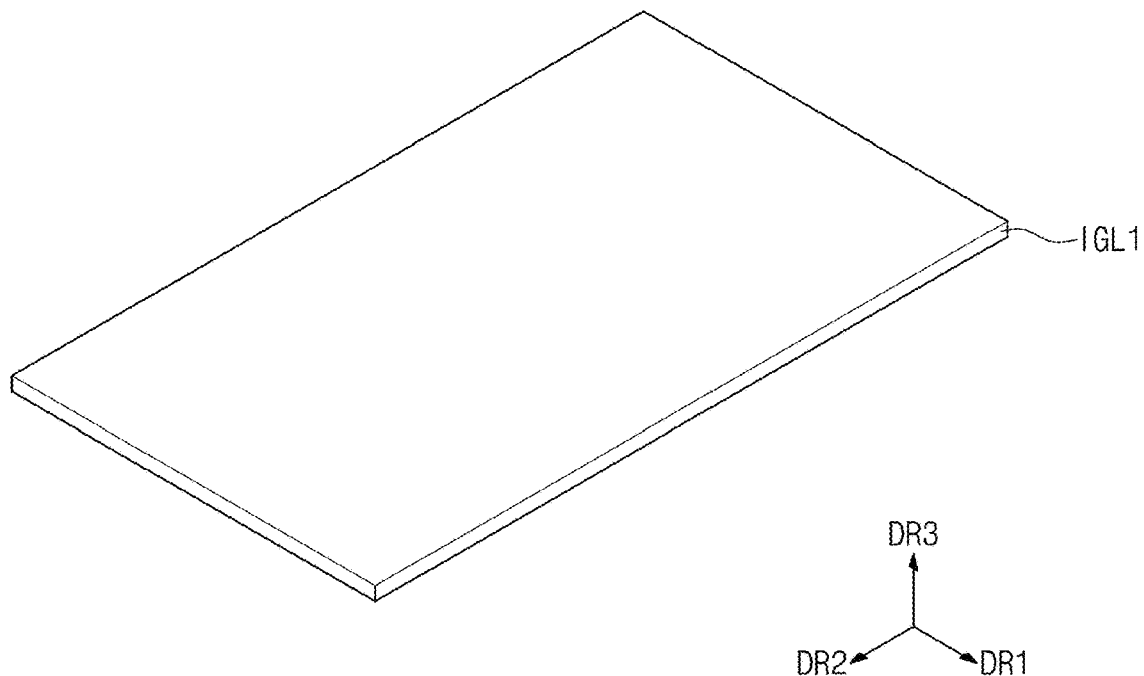
FIGS. 9A, 9B, 9C, 9D and 9E are perspective views illustrating a process of manufacturing the polarization layer of FIG. 7.

Referring to FIGS. 8 and 9A, a first inorganic layer IGL1 is formed (S21). Although not shown, the first inorganic layer IGL1 may be disposed on an overcoating layer OCL (see FIG. 3) of a filter layer CFL (see FIG. 3). In this embodiment, the first inorganic layer IGL1 may include at least one of silicon oxide, silicon nitride (SiNx), and silicon oxynitride (SiON).

Figure 9B:
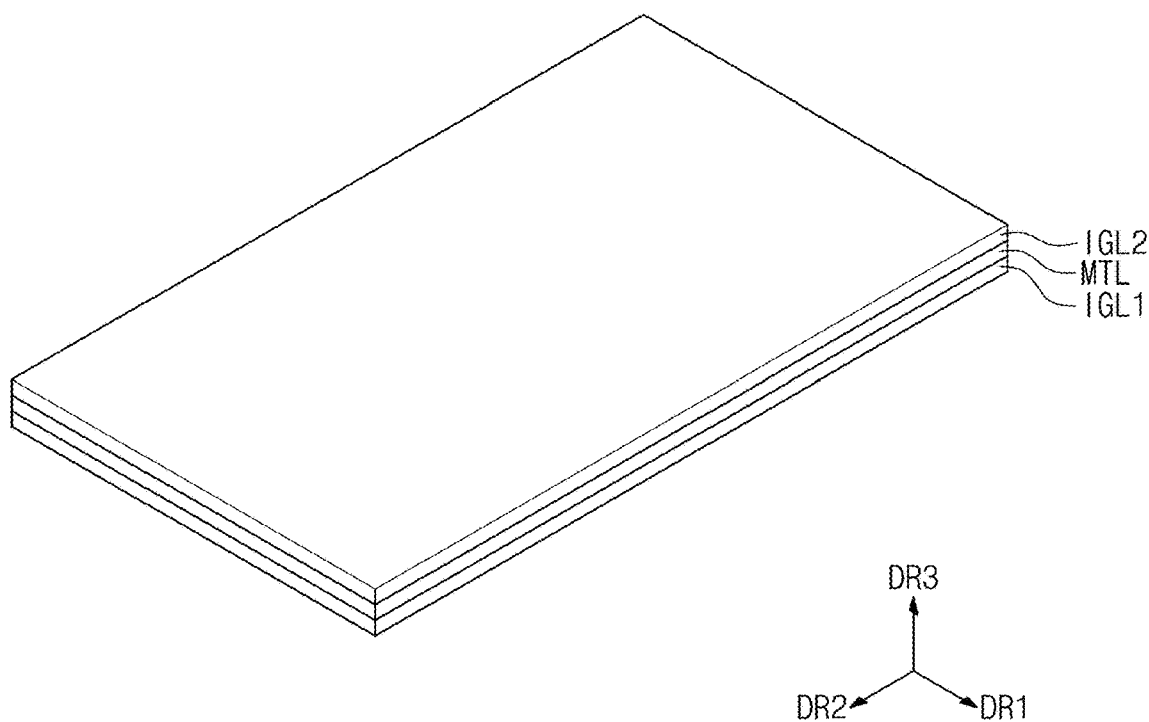

Referring to FIGS. 8 and 9B, after the first inorganic layer IGL1 is formed, a metal layer MTL is formed on the first inorganic layer IGL1 (S22). For example, the metal layer MTL may be made of aluminum. After the metal layer MTL is formed, a second inorganic layer IGL2 is formed on the metal layer MTL (S23). In this embodiment, the second inorganic layer IGL2 may include at least one of silicon oxide, silicon nitride (SiNx), and silicon oxynitride (SiON).

Figure 9C:
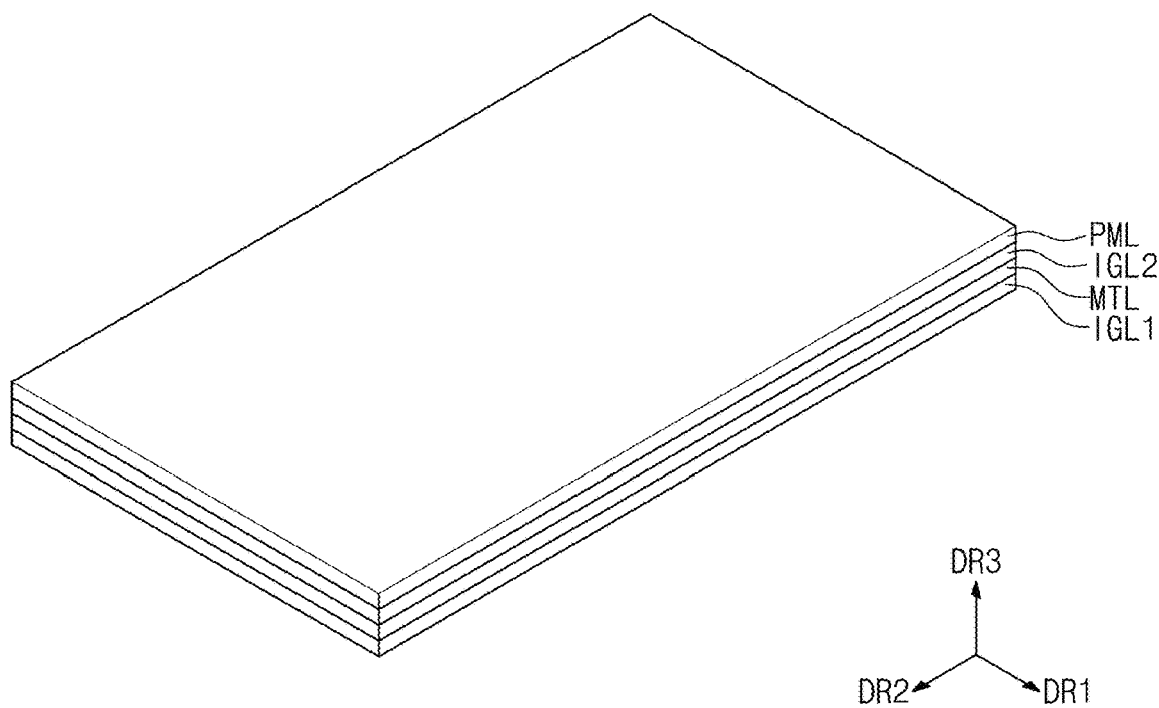

Referring to FIGS. 8 and 9C, after the second inorganic layer IGL2, an organic layer PML is formed on the second inorganic layer IGL2 (S24). In the current embodiment, the organic layer PML may be made of a resin.

Figure 9D:
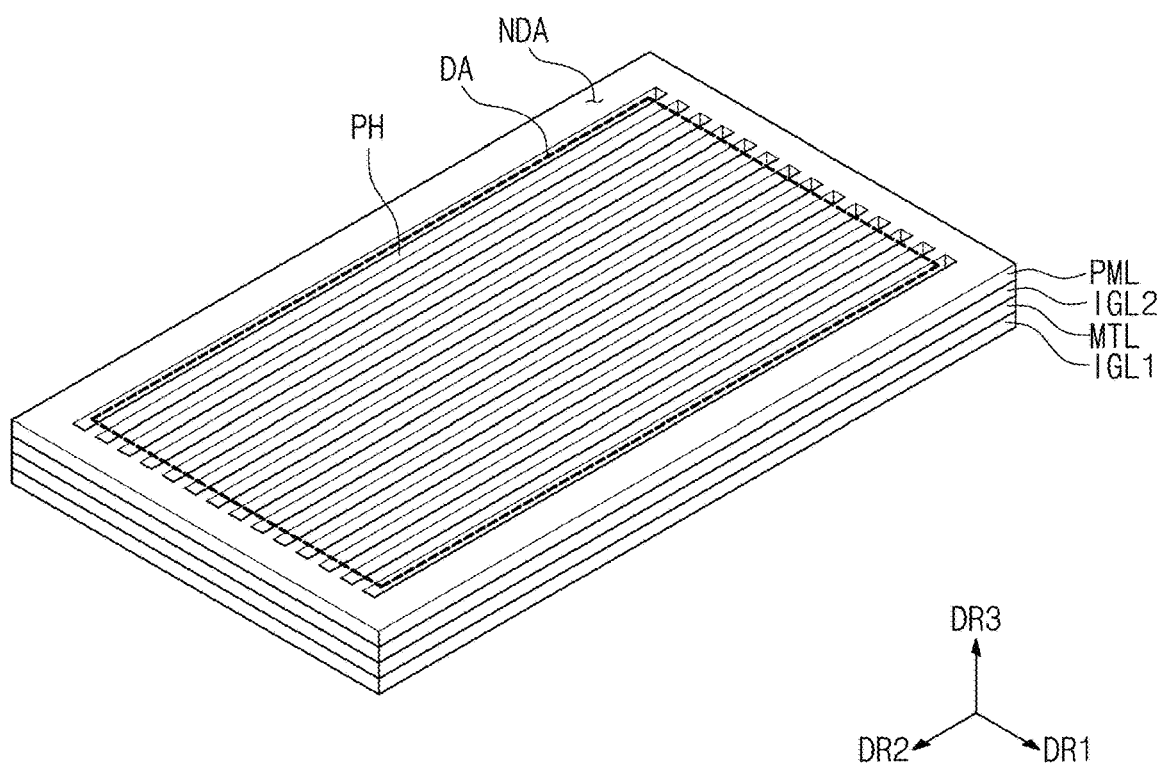
Figure 9E:
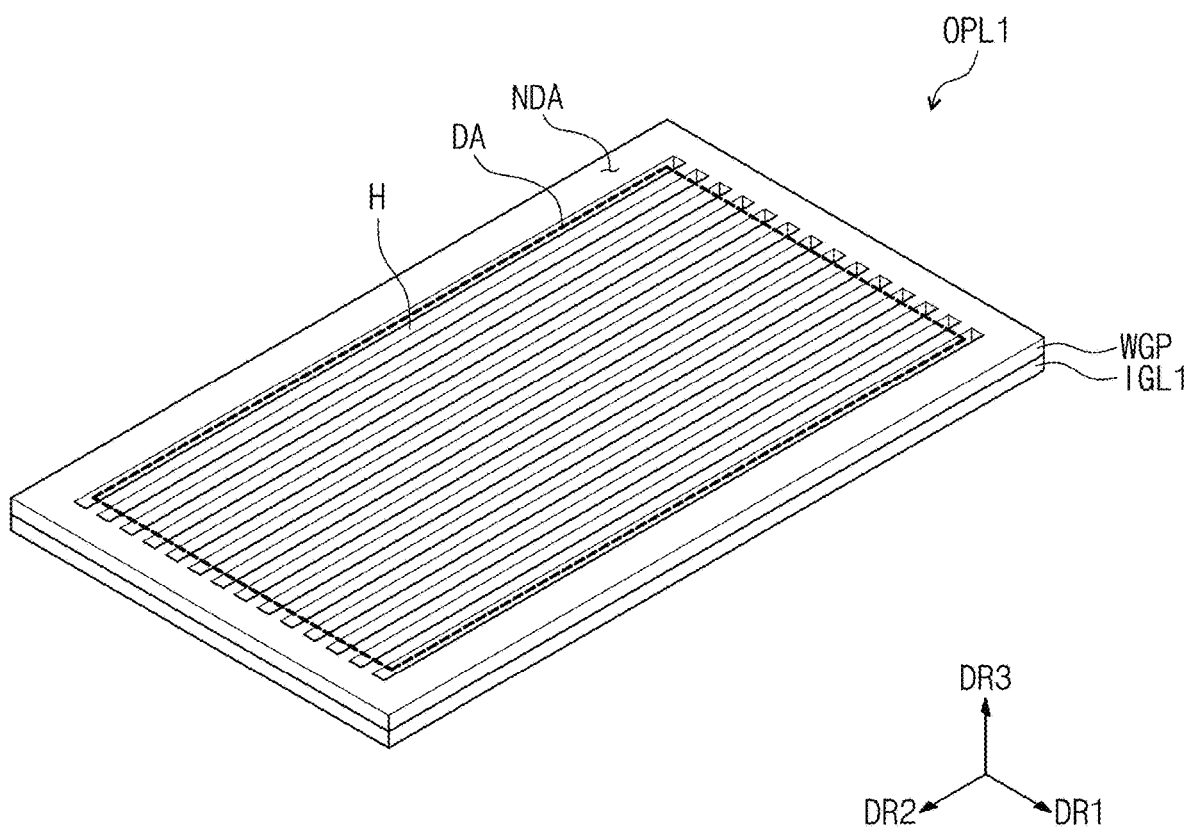

Thereafter, referring to FIGS. 8 and 9D, the organic layer PML is patterned (S25). According to this embodiment, the organic layer PML may be patterned by using a nano imprinting process.

Figure 10A:
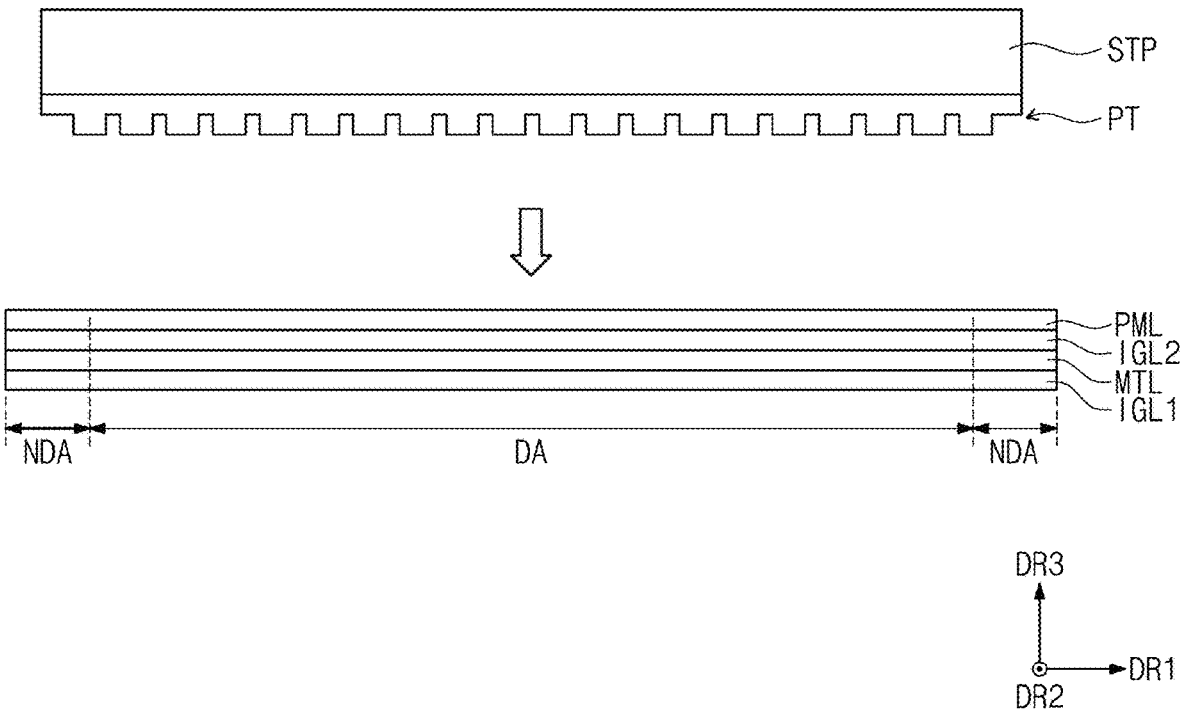
FIGS. 10A, 10B, 10C, 10D and 10E are cross-sectional view illustrating a process of forming the first polarization layer.

Referring to FIG. 10A, the organic layer PML is pressed by using a stamp STP. A bottom surface of the stamp STP includes a protrusion pattern PT. The protrusion pattern PT extends in a second direction DR2 and arranged in a first direction DR1.

Figure 10B:
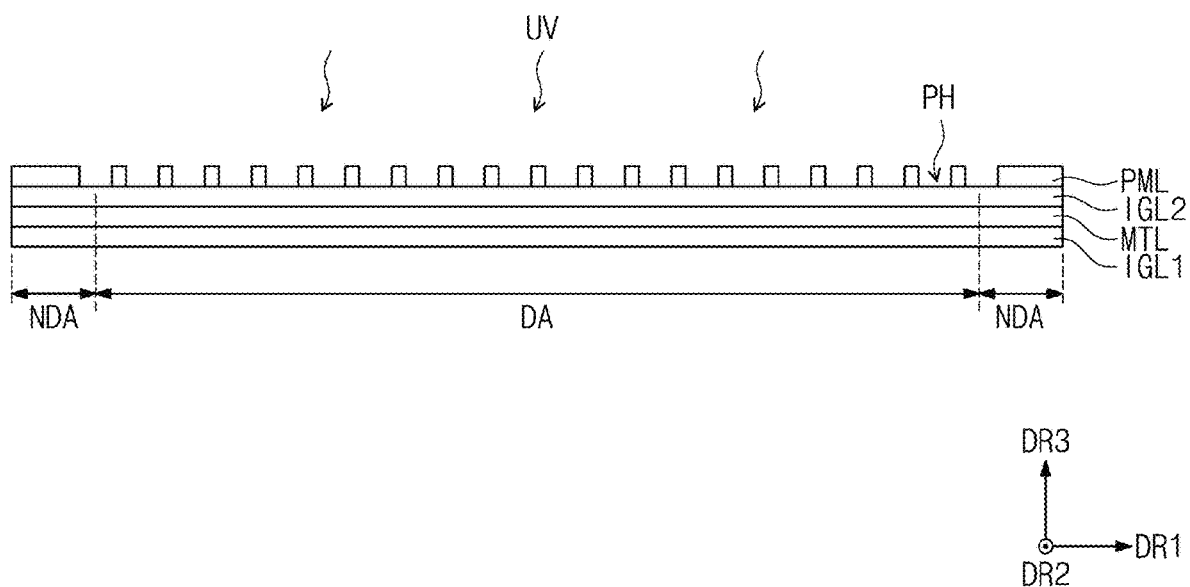
Figure 10C:
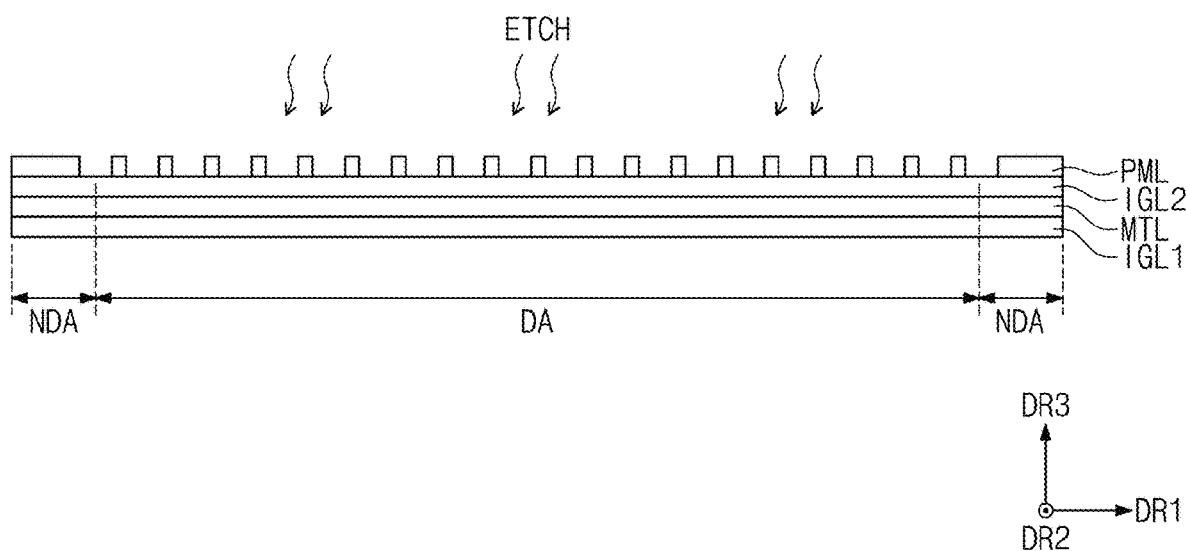
Figure 10D:
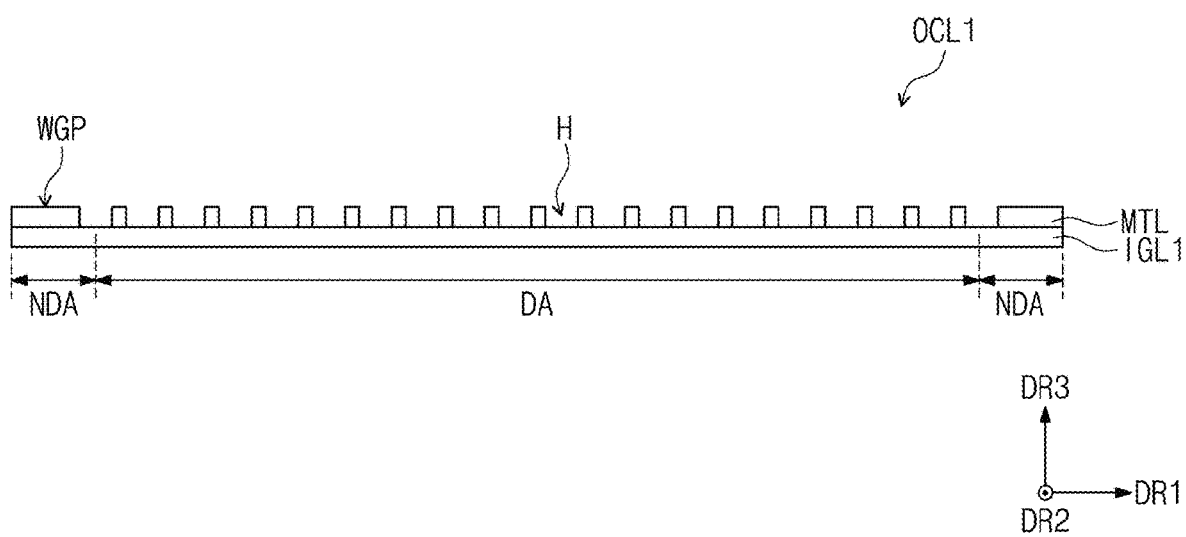
Figure 10E:
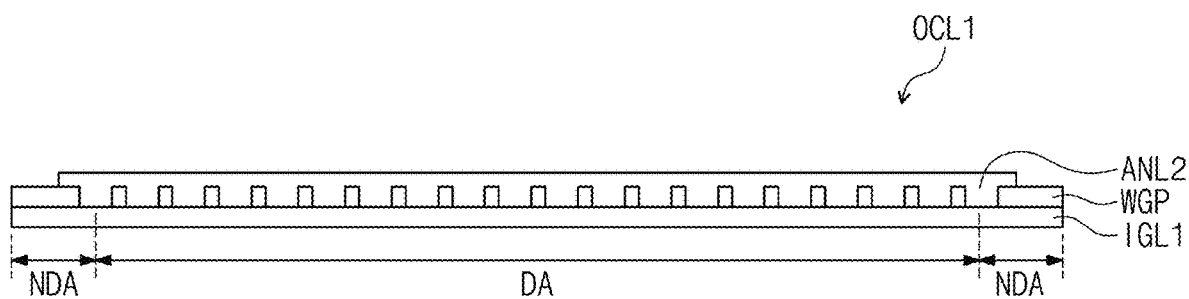

Referring to FIG. 10B, after the organic layer PML is pressed by using the stamp STP, ultraviolet (UV) light is irradiated. A plurality of pre-holes PH may be defined in the organic layer PML cured by the UV light.

The pre-holes PH correspond to the stamp STP. Each of the pre-holes PH extends in the second direction DR2, and the pre-holes PH are arranged in the first direction DR1. The pre-holes PH overlap the display area DA. A portion of a second inorganic layer IGL2 may be exposed by the pre-holes PH.

Referring to FIGS. 8, 9E, and 10C to 10D, after the organic layer PML is patterned, the organic layer PML, the second inorganic layer IGL2, and the metal layer MTL are etched using the patterned organic layer PML as a mask (S26). Here, the whole second inorganic layer IGL2 may be removed through the etching process. Also, a portion of the metal layer MTL which is not covered by the patterned organic layer PML and the second inorganic layer IGL2 may be removed through the etching process. The portion of the metal layer MTL corresponds to an area exposed by the pre-holes PH defined in the organic layer PML. That is, the metal layer MTL may be patterned. The patterned organic layer PML and the second inorganic layer IGL2 may be removed.

A plurality of slits H may be defined in the metal layer MTL through the etching process. The metal layer MTL in which the plurality of slits H are defined may be defined as a wire layer WGP.

After the wire layer WGP is formed, a second alignment layer ANL2 is formed on the wire layer WGP. The second alignment layer ANL2 entirely overlaps the display area DA. The second alignment layer ANL2 may protect the above-described wire parts GP of the wire layer WGP and align the above-described liquid crystal molecules LCM of the liquid crystal layer LCL.

According to the embodiment of the inventive concept, the display quality of the display apparatus may be improved. Also, according to the embodiment of the inventive concept, the display apparatus may be reduced in manufacturing cost and simplified in manufacturing process.

It will be apparent to those skilled in the art that various modifications and variations can be made in the inventive concept. Thus, it is intended that the present disclosure covers the modifications and variations of this inventive concept provided they come within the scope of the appended claims and their equivalents. Thus, to the maximum extent allowed by law, the scope of the present inventive concept is to be determined by the broadest permissible interpretation of the following claims and their equivalents, and shall not be restricted or limited by the foregoing detailed description.

What is claimed is:

1. A display apparatus comprising:
a display module including a display area and a non-display area that surrounds the display area,
wherein the display module comprises:
an upper substrate comprising a wire layer configured to polarize the light;
a lower substrate comprising a plurality of pixel electrodes and a common electrode line; and
a liquid crystal layer disposed between the upper substrate and the lower substrate,
wherein the wire layer comprises:
a plurality of wire parts disposed on the display area and spaced by a predetermined distance in a first direction; and
an electrode part connected to the wire parts, disposed on the non-display area, and electrically connected to the common electrode line,
wherein a first section of the liquid crystal layer overlaps the plurality of wire parts, and
wherein a second section of the liquid crystal layer overlaps the electrode part and is thicker than the first section of the liquid crystal layer in a second direction perpendicular to the first direction.

2. A display apparatus comprising:
a display module including a display area and a non-display area that surrounds the display area,
wherein the display module comprises:
an upper substrate comprising a wire layer configured to polarize the light;
a lower substrate comprising a plurality of pixel electrodes and a common electrode line; and
a liquid crystal layer disposed between the upper substrate and the lower substrate,
wherein the wire layer comprises:
a plurality of wire parts disposed on the display area and spaced by a predetermined distance; and
an electrode part connected to the wire parts, disposed on the non-display area, and electrically connected to the common electrode line, and
wherein the electrode part has a frame shape.

3. The display apparatus of claim 2, wherein the liquid crystal layer comprises a plurality of liquid crystal molecules driven by vertical electric fields generated between the wire layer and the pixel electrodes.

4. The display apparatus of claim 3, wherein the wire parts and the electrode part are formed of a same material and are formed in one piece.

5. The display apparatus of claim 3, wherein the display module further comprises a conductive material overlapping the non-display area and disposed between the upper substrate and the lower substrate,
the conductive material is configured to connect the common electrode line to the electrode part.

6. The display apparatus of claim 5, wherein the conductive material includes a plurality of conductive materials, and
the conductive materials are spaced apart from each other.

7. The display apparatus of claim 5, wherein the conductive material has a frame shape.

8. The display apparatus of claim 5, wherein the display module further comprises a sealing layer overlapping the non-display area and configured to couple the upper substrate to the lower substrate, and
the sealing layer is disposed outside the conductive material on the non-display area.

9. The display apparatus of claim 5, wherein the display module further comprises a sealing layer overlapping the non-display area and configured to couple the upper substrate to the lower substrate, and
the sealing layer is disposed inside the conductive material on the non-display area.

10. The display apparatus of claim 2, wherein the display module further comprises an alignment layer disposed on the wire parts to cover grooves between the wire parts.

11. The display apparatus of claim 2, wherein the upper substrate further comprises:
a first substrate; and
a filter layer disposed on the first substrate,
wherein the filter layer comprises a plurality of conversion filters configured to convert a wavelength of the incident light.

12. The display apparatus of claim 11, wherein the filter layer further comprises an overcoating layer disposed on the conversion filters to cover the conversion filters, and
the upper substrate further comprises a first inorganic layer disposed between the overcoating layer and the wire layer.

13. The display apparatus of claim 11, further comprising a backlight unit configured to generate first light, and
the conversion filters comprise:
a first conversion filter configured to convert the first light into second light; and
a second conversion filter configured to convert the first light into third light.

14. The display apparatus of claim 13, wherein the first conversion filter comprises a plurality of first quantum dots,
the second conversion filter comprises a plurality of second quantum dots, and
each of the first quantum dots has a size greater than that of each of the second quantum dots.

15. The display apparatus of claim 2, wherein the wire layer is made of a metal.

16. A display apparatus comprising:
a display module including a display area and a non-display area that surrounds the display area,
wherein the display module comprises:
an upper substrate comprising a wire layer configured to receive a constant voltage, the wire layer comprising a plurality of wire parts configured to polarize the light and spaced by a predetermined distance, the wire layer further comprising an electrode part electrically connected to the wire parts;
a lower substrate comprising a plurality of pixel electrodes disposed on the display area; and
a liquid crystal layer disposed between the upper substrate and the lower substrate, contacting the electrode part at the non-display area, and spaced from the wire parts at the display area.

17. The display apparatus of claim 16, wherein the liquid crystal layer comprises a plurality of liquid crystal molecules driven by vertical electric fields generated between the wire layer and the pixel electrodes.

18. The display apparatus of claim 17, wherein the lower substrate further comprises a common electrode line disposed on the non-display area, and the common electrode line is electrically connected to the wire layer.

19. The display apparatus of claim 18, wherein the electrode part is electrically connected to the common electrode line on the non-display area.

* * * * *